Jan. 16, 1968　　　　J. B. KUCERA　　　　3,363,785
SILO UNLOADING MACHINE

Filed Dec. 2, 1965　　　　　　　　　　4 Sheets-Sheet 1

INVENTOR
JOSEPH B. KUCERA
BY
ATTORNEY

Jan. 16, 1968
J. B. KUCERA
3,363,785
SILO UNLOADING MACHINE
Filed Dec. 2, 1965
4 Sheets-Sheet 2
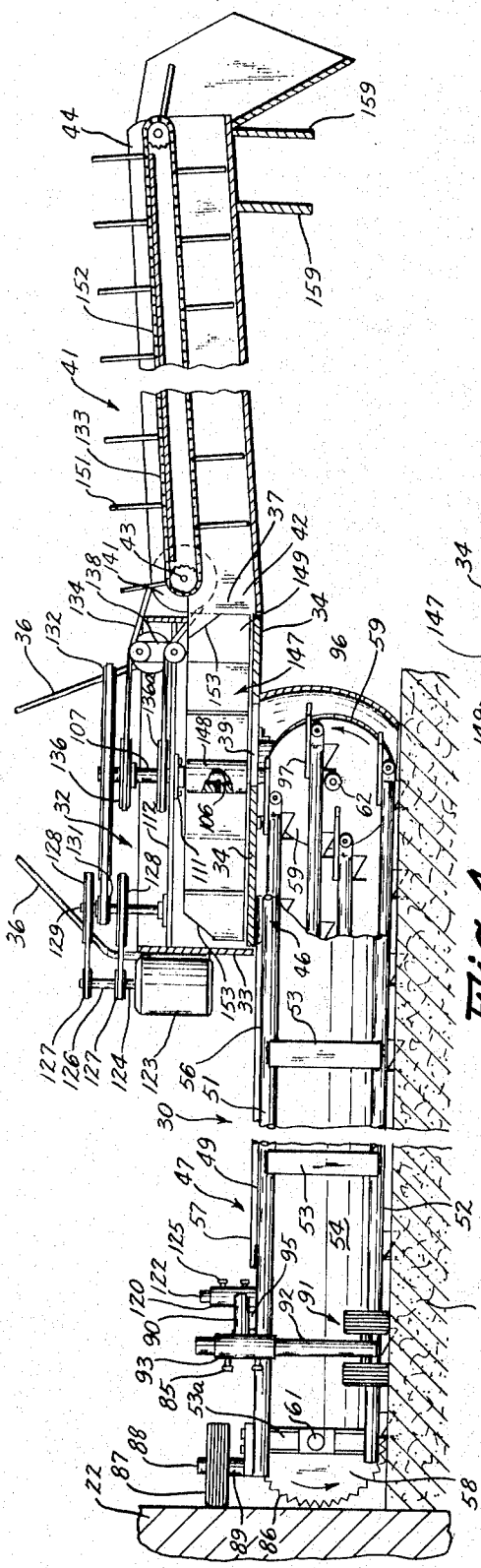
Fig. 4
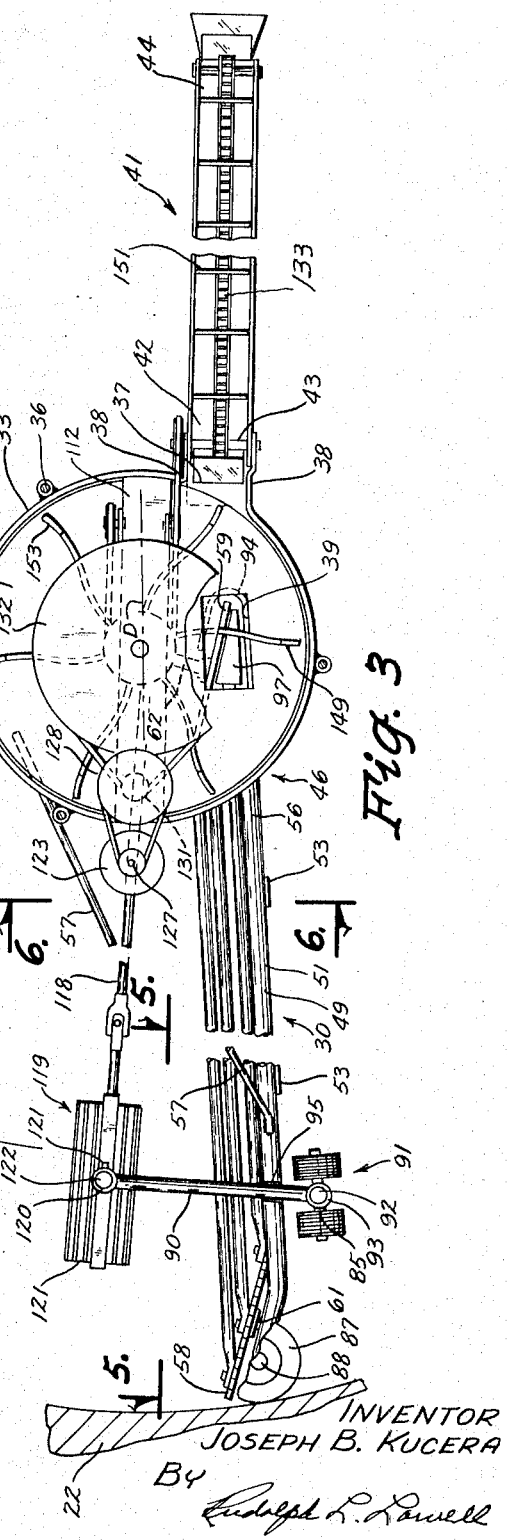
Fig. 3
Fig. 5.
Fig. 6.
INVENTOR
JOSEPH B. KUCERA
BY
Rudolph L. Lowell
ATTORNEY

INVENTOR
JOSEPH B. KUCERA
BY
ATTORNEY

Jan. 16, 1968   J. B. KUCERA   3,363,785
SILO UNLOADING MACHINE
Filed Dec. 2, 1965   4 Sheets-Sheet 4
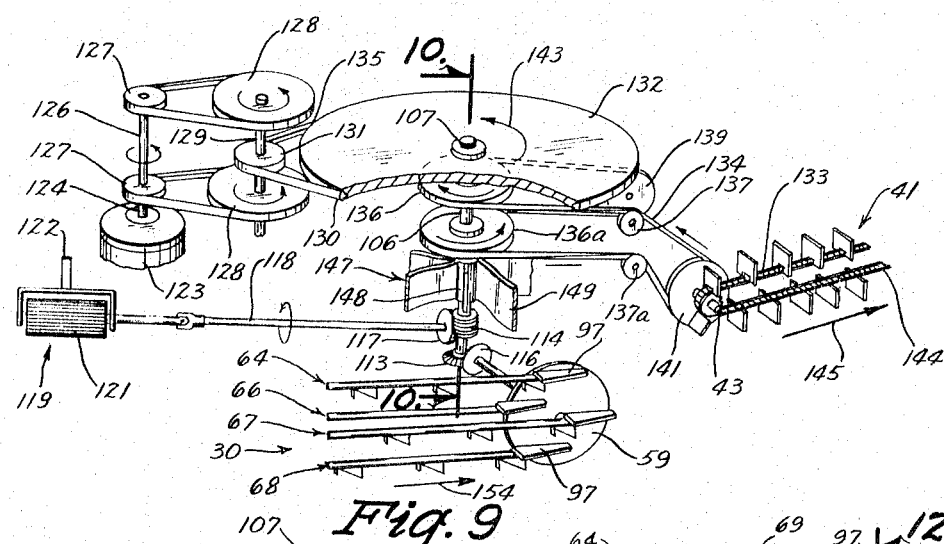
Fig. 9
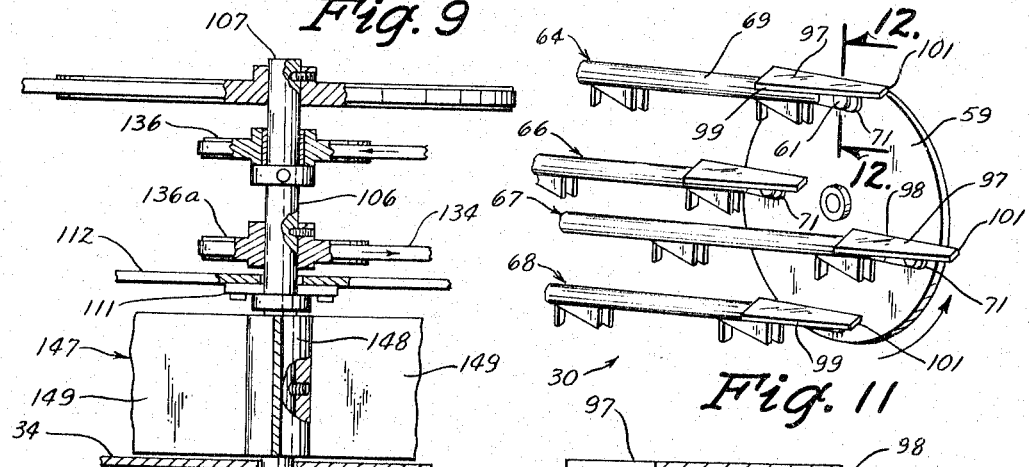
Fig. 10   Fig. 11   Fig. 12
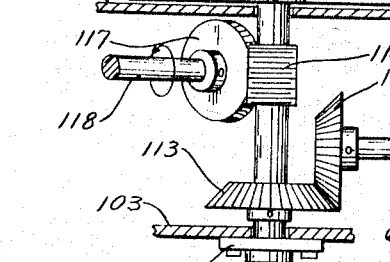
Fig. 8
INVENTOR
JOSEPH B. KUCERA
BY
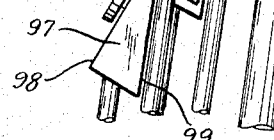
ATTORNEY United States Patent Office 3,363,785
Patented Jan. 16, 1968

3,363,785
SILO UNLOADING MACHINE
Joseph B. Kucera, Traer, Iowa, assignor of one-half to
Rudolph L. Lowell, Des Moines, Iowa
Filed Dec. 2, 1965, Ser. No. 511,102
8 Claims. (Cl. 214—17)

ABSTRACT OF THE DISCLOSURE

A silo unloader which includes a silage engaging and conveying means for moving silage toward the center of a silo, and comprised of a plurality of rake assemblies extended generally radially of the silo and connected together for concurrent reciprocal movement in an upright elliptical path. The centrally moved silage is moved upwardly by an elevating means associated with the inner ends of the rake assemblies. The upwardly moved silage is then picked up by a horizontally rotatable conveyor unit for transfer to a discharge conveyor. Centrifugal force is at no time used in the moving of the silage, which is in direct engagement at all times with all of the conveying structures so that the unloader may be efficiently operated at varying speeds.

---

This invention relates to a material gathering and conveying apparatus and more particularly to a silo unloader for removing silage stored in a silo.

An object of this invention is to provide an improved silo unloader which has a silage engaging and conveying means engageable with the top surface of silage and operative to remove and deliver the top layer of silage to the center area of the silo. A conveyor means receives the silage from the center area of the silo and delivers the silage to a silo discharge chute.

Another object of the invention is to provide a silo unloader wherein a silage engaging and conveying means removes and feeds silage from the top surface of stored silage toward the center area of the silo and then elevates the silage thus removed to a discharge conveyer.

A further object of the invention is to provide a silo unloader having a silage engaging and gathering means comprised of a plurality of elongated rake or gathering assemblies extended laterally of the silo and connected together for concurrent longitudinal reciprocal movement and transverse movement in an upright elliptical path so as to successively dig into and deliver the top layer of silage toward the center area of the silo. Lifter plates at the inner ends of the rake assemblies elevate the centrally delivered silage to a conveyor means for discharge from the silo.

Another object of this invention is to provide a silo unloader wherein a silage engaging and gathering means extended laterally of the silo includes a plurality of laterally extended rake assemblies operable to remove and deliver silage to the center area of the silo, to elevate the delivered silage into a silage discharge conveyer, and to horizontally move the gathering means about the center area of the silo.

A further object of this invention is to provide a silo unloader wherein a silage gathering means includes a plurality of elongated rake assemblies successively movable in a lateral direction toward the center area of the silo to engage and move silage to the center area of the silo concurrently with horizontally moving the gathering means about the center area of the silo.

Another object of the invention is to provide in a silo unloader a laterally extended silage gathering means including a plurality of horizontal reciprocating rake assemblies arranged in a parallel spaced relation and movable in a continuous upright elliptical path to sequentially engage and move silage toward the center area of the silo concurrently with walking the silage gathering means horizontally about the center area of the silo.

An additional object of this invention is to provide an economical silo unloader which is sturdy in construction and readily accessible for repair and servicing purposes.

Other objects and advantages of the apparatus embodying the invention will be apparent from the following description when taken in connection with the accompanying drawings in which:

FIG. 3 is a foreshortened enlarged plan view of the silage unloader shown in FIG. 2;

FIG. 4 is an enlarged foreshortened side elevational view of the silo unloader shown in FIG. 1 with some parts broken away and other parts shown in section to more clearly show the construction thereof;

FIG. 8 is an enlarged detail sectional view taken along the line 8—8 in FIG. 6;

FIG. 9 is a schematic perspective view of the silage unloader power transmission system;

FIG. 10 is an enlarged view partly in section showing the assembly of the main drive shaft for the silage gathering unit, shown generally in FIG. 6, with the members driven therefrom;

FIG. 11 is an enlarged perspective view of the inner end portion of the silage gathering means;

FIG. 12 is an enlarged sectional view taken along the line 12—12 of FIG. 11;

Figure 1:
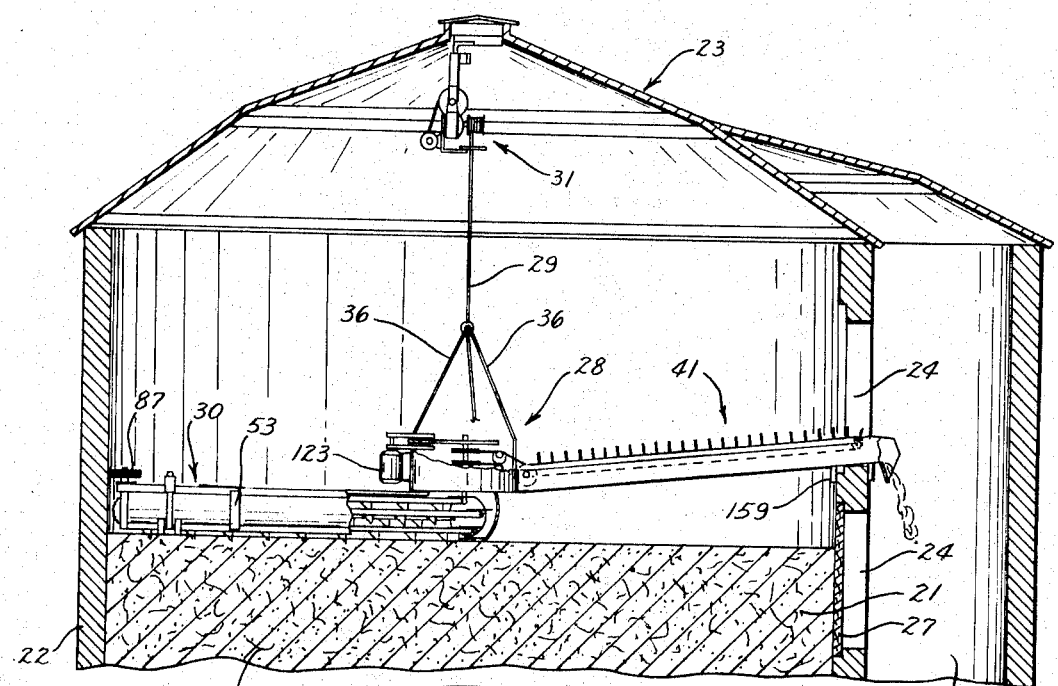
FIG. 1 is a vertical fragmentary sectional view of a silo showing in side elevation the silo unloader of this invention in operative relation with the silage stored in the silo with parts of the unloader being broken away for the purpose of clarity.

Referring to the drawing there is shown in FIG. 1 an upright cylindrical silo 20 partially filled with silage 21 such as cut grasses or corn. The silo 20 is a conventional structure having a circular upright side wall 22 and a roof unit 23 supported on the top edge of the side wall 22. Vertically aligned openings or doorways 24 in the side wall 22 open into an upright silage discharge chute 26. In order to retain the silage 21 in the silo removable doors 27 are positioned in the doorways 24. As the level of the silage is lowered the doors 27 are removed from the doorway above the surface of the silage thereby providing an access or discharge opening through which the silage may be discharged into the chute 26.

The silo unloader of this invention, indicated generally at 28, is suspended from the roof unit 23 by a cable 29 and a winch means 31 supported at the top of the silo. In operation a silage engaging and conveying unit 30, of the silo unloader 28, engages and conveys the top layer of silage to the center area of the silo. From the center area of the silo the unit 30 conveys the silage through a doorway 24 into the discharge chute 26. The vertical position of the silo unloader 28 relative to the top surface of the silage is controlled by the winch means 31 which may be of the automatic type as disclosed in applicant's Patent No. 3,204,786.

Figure 2:
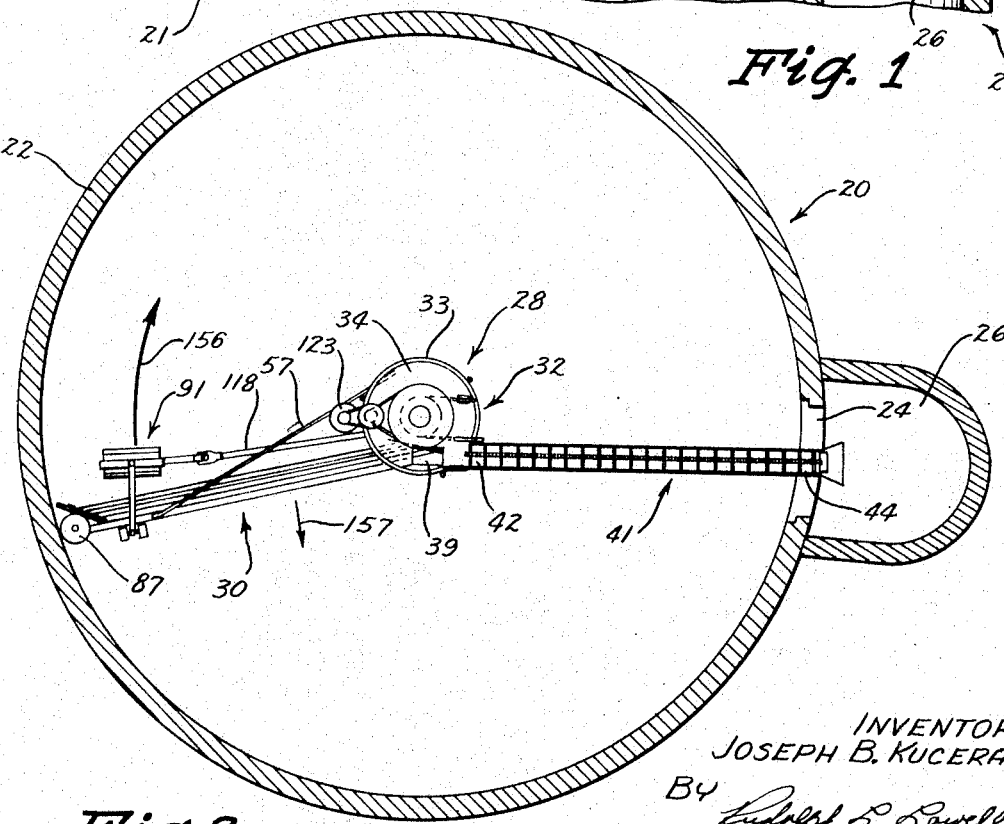
FIG. 2 is a plan view of the silage unloader of FIG. 1.

As shown in FIGS. 2, 3 and 4 the silo unloader 28 includes a receiving and conveying unit 32 of a substantially pan shape having an upright circular wall member 33 and a disc shape bottom wall 34. For a purpose to appear later the bottom wall 34 is rotatable relative to the circular wall member 33. As illustrated three hanger members 36 support the wall member 33 from the suspension cable 29.

Referring to FIG. 4 it is seen that the wall member 33 is provided with a silage outlet opening 37 formed by laterally extending outwardly, in a parallel relation, adjacent end portions 38 of the circular wall member 33. A silage inlet opening 39 for the conveying unit 32 is formed in the pan bottom wall 34. This inlet opening is of a generally rectangular shape and is located intermediate a radial dimension of the wall 34, namely at a substantially central position between the outer periphery and center of the pan bottom wall 34. A laterally extended silage discharge conveyer 41 has an inner inlet end 42 positioned at the outlet 37 of the conveying unit 32 and pivotally supported on a shaft 43 carried on the wall portions 38 for up and down pivotal movement of its outer or discharge end 44. The conveying unit 32 and discharge conveyer 41 thus constitute a conveyer means for receiving silage from the inner end of the silage engaging and conveying unit 30, and then discharging such received silage into the upright chute 26.

Arranged below and having an inner end 46 secured to the underside of the pan bottom wall 34 is the silage gathering and conveying unit 30. As best appears in FIG. 3 the silage gathering unit 30 is of an elongated construction having its inner end 46 located below the inlet opening 39 of the receiving and delivering conveying unit 32 and its outer end terminating adjacent the inner peripheral surface of the silo wall 22. It is thus seen that the silage gathered by the unit 30 is directed toward its inner end 46 for delivery through the inlet opening 39 into the conveying unit 32 for discharge therefrom through the pan outlet 37 and into the conveyer 41 for delivery to the chute 26.

Figures 6, 7:
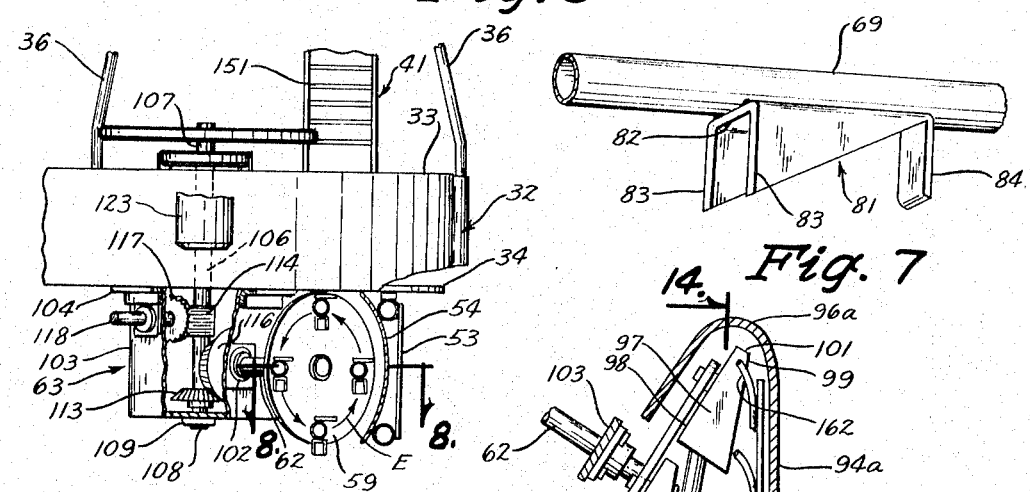
FIG. 6 is an enlarged sectional view taken along the line 6—6 of FIG. 3 with some parts broken away.
FIG. 7 is an enlarged detail perspective view of a rake assembly of the silage gathering means of FIG. 5 showing the assembly of a rake member thereon.

The silage gathering and conveying unit 30 (FIGS. 3 and 4) includes a frame structure 49 comprised of longitudinally extended vertically spaced upper and lower frame members 51 and 52, respectively, which are of a tubular construction and connected together by upright brace members 53. Secured to and extended between the frame members 51 and 52 is a silage holding or follower plate 54 which is substantially coextensive in length with the frame members 51 and 52. The follower plate is transversely curved, as shown in FIG. 6, with its concave side facing the silage engaging and conveying unit 30. The inner end of the upper frame member 51 (FIG. 4) carries a connecting bar 56 secured as by welding to the underside of the pan bottom wall 34. The outer end of the frame member 51 (FIG. 3) is secured to the underside of the pan bottom wall 34 by a tie or brace rod 57.

The frame structure 49 lies in a plane substantially parallel to the diameter of the pan bottom wall 34 indicated at D at a position spaced forwardly of the vertical plane of the diameter D so as to be extended laterally outwardly from the unit 32 in a rearwardly offset relation relative to the center of the unit 32.

A pair of rotatable disc members 58 and 59 carried at opposite ends of the frame structure 49 are located at the opposite ends of the frame structure (FIGS. 3 and 4). These disc members 58 and 59 are of an equal size having diameters substantially equal to the height of the follower plate 54 and are arranged in parallel planes inclined relative to the upright plane of the frame structure 49. For the purpose of convenience the disc member 58 will be referred to as the outer or driven disc, and the disc member 59 as the inner or drive disc.

The driven disc 58 (FIG. 4) is rotatably mounted on a horizontal stub shaft 61 which is supported on the upright brace member indicated as 53a. The drive disc 59 is carried on a horizontal shaft 62 that forms part of a gear and housing unit 63 which is best shown in FIG. 6.

A plurality of elongated collector or rake assemblies 64, 66, 67 and 68, illustrated as four in number, are extended between and rotatably supported on the disc members 58 and 59. These rake assemblies are in a spaced parallel relation and parallel to the upright plane of the frame structure 49. Since each assembly 64, 66, 67 and 68 is of a like construction and similarly connected to the disc members 58 and 59 only the rake assembly 64 will be described in detail with like numbers designating like parts on the remaining rake assemblies.

The rake assembly 64 (FIGS. 11 and 12) includes an elongated tubular body member 69 having flattened end portions 71 and 72 extended laterally from opposite sides of the body member in parallel planes inclined relative to the longitudinal axis of the body member 69. The inclination of the flattened end portions 71 and 72 corresponds to the angular inclination of the disc members 58 and 59 relative to the longitudinal axis of the body member 69 so that the end portions 71 and 72 lie in planes which are parallel to the planes of the disc members 58 and 59.

The end portion 71 is rotatably carried on the stub shaft 61 by means including a tubular bearing 73 which extends through an opening 74 formed in the end portion 71 so as to project outwardly from opposite sides of the flat end portion 71. The tubular member 73 is secured as by welding to the end portion 71. A sleeve bearing 76 of an axial length greater than the axial length of the tubular member 73 is inserted within the tubular member and mounted on the stub shaft 61. Washers 77 mounted on the shaft 61 are located to opposite ends of the sleeve bearing member 76.

In assembly the tubular and sleeve bearing members 73 and 76, respectively, and the washers 77 are arranged between the driven disc 58 and a head section 78 on the shaft 61 so that on tightening of the shaft nut 79 the bearing 76 and washer 77 are clamped between the disc 58 and the shaft head 78. By virtue of the sleeve bearing 76 being of an axial length greater than that of the tubular member 73 the body member 69 is rotatable on the sleeve bearing 76 free of the clamping action of the nut 79.

The end portion 72 of the body member 69 is similarly assembled for rotatable support on the drive disc 59.

Figure 5:
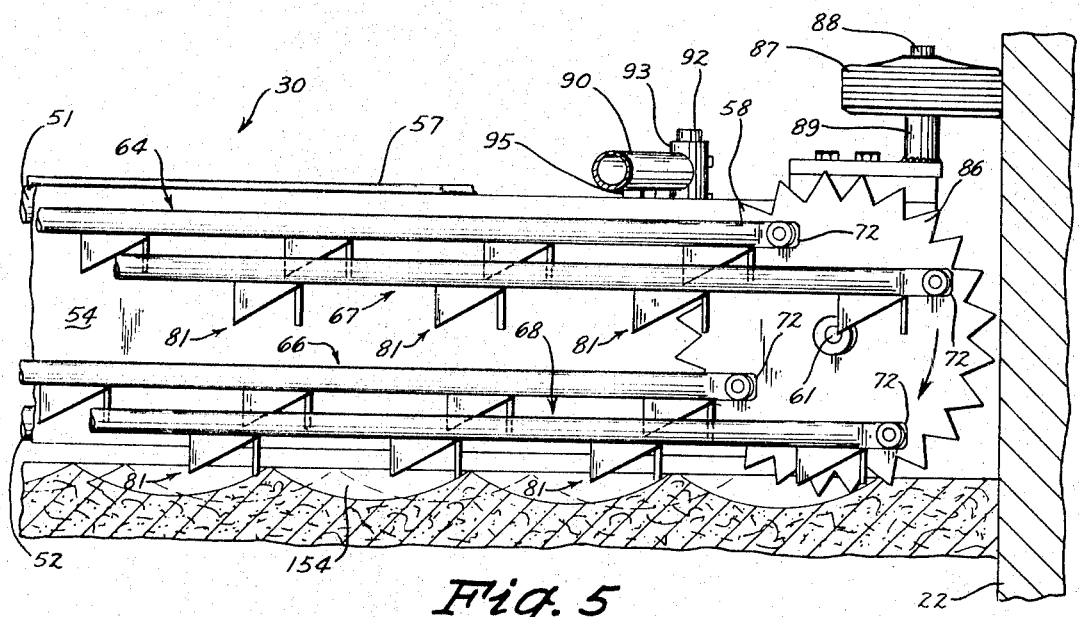
FIG. 5 is an enlarged detail elevational view of the outer end portion of the silage gathering means as seen on line 5—5 in FIG. 3.

Referring to FIGS. 5 and 11 it is seen that the body members 69 of the rake assemblies 64, 66, 67 and 68 are rotatably supported on the disc members 58 and 59 in an equal angular spaced relation so that the rotatable connections are spaced 90° apart and positioned adjacent the peripheries of the discs 58 and 59. By virtue of the inclination of the discs 58 and 59 relative to the longitudinal axes of the body members 69, on rotation of the drive disc 59 the assemblies 64, 66, 67 and 68 are longitudinally reciprocated concurrently with being moved vertically and horizontally of the discs 58 and 59 in an upright elliptical path indicated at E in FIG. 6. The rake assemblies are thus sequentially moved in a clearance relation with each other from a position at the bottom portions of the discs 58 and 59 to vertically disposed positions at the upper portions of the discs 58 and 59 corresponding to silage gathering and delivery positions, respectively, as will appear later.

Spaced longitudinally of each body member 69 and supported in a depending relation from the lower side thereof are a plurality of rake members 81. As best appears in FIG. 7 each rake member 81 is of a U-shape in transverse cross section so as to have a base section 82 and leg sections 83. The base section 82 is secured as by welding to the underside of the tubular member 69 so that the leg sections 83 project downwardly at positions spaced outwardly from corresponding opposite sides of the body member 69. From their forward or leading ends the leg sections are tapered upwardly and rearwardly so that the rear ends therof terminate at the rear end of the base section 82. Projected vertically downwardly from the rear end of the base section 82 and formed integrally therewith is a flat transversely extended blade section 84. This blade section 84 is of a width substantially equal to the space between the leg sections 83 and of a length substantially equal to the vertical height of the leg sections 83 at the leading ends thereof.

The driven disc 58 (FIGS. 3 and 5) is formed about its periphery with scraper or chipping teeth 86. With the disc 58 positioned adjacent the inner periphery of the silo wall 22 the teeth 86 on rotation of the disc 58 function to remove any silage or ice adhering to the side wall of the silo so as to provide for a complete removal of all silage within the silo. The position of the chipper or scraper teeth 86 in a working clearance with the silo wall 22 is maintained by a guide wheel 87 which is in continuous engagement with the silo wall 22. The guide wheel 87 is horizontally rotatable on a vertical shaft 88 which is carried in a bearing 89 secured to the outer ends of the top frame member 51.

The outer end of the gathering unit 30 carries a wheel assembly 91 that is in rolling engagement with the top surface of the silage 21. The wheel assembly 91 is located rearwardly of the frame structure 49 and includes an upright support member 92 which is adjustable supported for vertical up and down movement in a tubular sleeve 93 carried at the rear end of a supporting bar 90 that is secured at 95 on the upright frame member 51. Vertical adjustment of the wheel assembly 91 is accomplished by set screws 85 threadable in the sleeve 93 into frictional engagement with the support member 92. It is seen therefore that the wheel assembly 91 is located rearwardly of the frame structure 49 and is vertically adjustable so as to ride on the surface of the silage 21 behind the gathering unit 30. As a result the gathering unit 30 is maintained in a horizontal laterally extended position to provide for a uniform action of the rake teeth or members 81 over the full length of a corresponding body member 69.

As shown in FIGS. 3 and 4 that portion of the drive disc 59 located below the inlet opening 39 in the bottom wall 34 of the conveying unit 32 is enclosed within a housing or chute 94 which is illustrated as being integrally formed with the follower plate 54. The housing 94 is of a generally U-shape in transverse section and of a curved form in side plan view so that the base portion 96 thereof is generally concentric with the adjacent portion of the disc member 59. The upper end of the housing 94 is secured as by welding to the underside of the bottom wall 34 in a contiguous relation with three of the side walls of the inlet opening 39. In other words, the inner surface of the upper end of the housing 94 is outside of the above mentioned three side walls of the inlet opening 39 so as not to obstruct the opening 39.

Silage collected by the gathering unit 30 is moved upwardly through the chute 94 and inlet opening 39 by means including horizontally extended lift members 97 formed as part of the rake assemblies 64, 66, 67 and 68. A lift member 97 (FIGS. 8 and 12) is of a flat irregular trapezoidal shape having a straight inner side 98 and an opposite tapered side 99. A lift member 97 is welded to the top side of an end portion 71 of a corresponding rake assembly, with its straight side 98 parallel to and in a clearance relation with the adjacent side of the drive disc 59. The tapered side 99 (FIG. 8) is substantially parallel to a body member 69 and is located outwardly therefrom so that a lift member 97 overlies the included angle between the body member 69 and inclined end portion 71. The small end 101 of the lift member 97 extends longitudinally outwardly from a corresponding end portion 71 in a clearance relation with the base portion 96 of the housing 94.

Thus on rotation of the drive disc 59 in a direction upwardly within the housing 94 the lift members 97 cooperate to successively move the gathered silage upwardly through the housing and the inlet opening 39. In other words as the lift members 97 move in succession upwardly of the housing 94 the gathered silage is continuously acted upon so as to be moved upwardly through the inlet opening 39 and onto the bottom wall 34.

It is seen therefore that the lift members 97 coact with the housing 94 to elevate silage gathered by the rake assemblies 64, 66, 67 and 68 during the movement of the lift members upwardly within the housing. The lift members, as shown in FIG. 8, are clear of the housing in their downward movement.

The drive shaft 62 (FIG. 6) on which the drive disc 59 is mounted is rotatably supported in a bearing 102 secured to the housing 103 of the housing and gear unit 63. In turn the housing 103 is secured to the underside of the bottom wall 34 by screws 104. Extended centrally and upwardly through the housing 103, the bottom wall 34 and the conveying unit 32 is a main drive shaft 106 the top section 107 of which projects upwardly from the unit 32. The lower end of the main drive shaft 106 has a lower end portion 108 projected downwardly from the bottom wall of the housing 103 and carries a bearing 109 for rotatably supporting the housing 103 thereon. In other words, the housing 103 and bottom wall 34 are supported on the main drive shaft 106 at the bearing 109.

The top section 107 of the main drive shaft 106 (FIGS. 4 and 10) is rotatable within and supported against downward axial movement by a bearing unit 111 that is secured to a cross plate 112 extended transversely across the conveying unit 32 with its opposite ends secured to the circular wall member 33. The main drive shaft 106 is thus rotatable relative to the circular and bottom wall members 33 and 34, respectively, and to the housing 103. The bottom wall 34, housing 103 and gathering unit 30 are thus supported from the main drive shaft 106 for rotational movement relative thereto as a unit assembly.

Within the housing 103 (FIG. 6) the main drive shaft 106 carries for rotation therewith a bevel gear 113 and a worm 114. The bevel gear 113 is in meshed engagement with the bottom portion of a bevel gear 116 that is mounted at the inner end of the drive shaft 62 for the drive disc 59. The worm 114 is in meshed engagement with a worm gear 117 which is carried at the inner end of a shaft 118 for operating a drive unit 119 as shown in FIGS. 3 and 9. The drive unit 119 may be used to horizontally rotate the gathering unit 30 about the main drive shaft 106. The drive unit 119 includes a silage engaging drive roller 121 which as shown in FIG. 3 is connected to the supporting bar 90 so as to apply a pulling force thereon. The rear end of the bar 90 carries an upright sleeve 120 for adjustable connection with an upright connecting member 122 of the drive unit 119 (FIGS. 3 and 9). The member 122 is received within the sleeve 120 and held in a vertically adjusted position within the sleeve by set screws 125 threadable in the sleeve for frictional engagement with the connecting member 122.

The main drive shaft 106 is rotated by an electric motor 123 (FIGS. 3 and 4) suitably secured to the circular wall member 33 of the unit 32, with the motor shaft 124 in a vertical position and having an upwardly projected section 126. A pair of pulleys 127 (FIGS. 4 and 9) are belt connected with corresponding pulleys 128 carried on an upright shaft 129 that is rotatably supported on the cross plate 112. A third pulley 131 mounted on the shaft 129 intermediate the pulleys 128 is belt connected to a top pulley 132 on the upper section 107 of the main drive shaft 106.

An endless conveyer 133 for the discharge conveyer unit 41 is driven from the main drive shaft 106 through a plurality of pulleys connected by a common belt 134. Thus as best appears in FIG. 9 this transmission drive for the endless conveyer 133 includes a pair of vertically spaced pulleys 136 and 136a mounted on the top section 107 of the main drive shaft 106 at a position below the top drive pulley 132. The lower pulley 136a (FIG. 10) is secured to the drive shaft 106 for rotation therewith, while the upper pulley 136 is rotatable on the shaft 106.

A pair of idler pulleys 137 and 137a (FIG. 4) corresponding to the pulleys 136 and 136a, respectively, lie in a common vertical plane and are supported for rotation about horizontal axes by bearing means indicated generally at 138 carried on the cross member 112. As shown in FIGS. 4 and 9 the top portions of the pulleys 137 and 137a lie in the tangents extended respectively from vertically opposite side portions of the pulleys 136 and 136a. A third idler pulley 139 supported on the bearing means 138 for rotation about a horizontal axis has its top portion lying in the tangent of that side of the upper pulley 136 opposite the tangent to the pulley 137. The bottom portion of the pulley 139 lies in the tangent of that side of the lower pulley 136a opposite the tangent to the pulley 137a.

Mounted on the shaft 43 of the discharge conveyor 41 is a pulley 141 which is positioned in the plane of the pulleys 137 and 137a. The common belt 134 is trained about the pulleys 136, 136a, 137, 137a, 139 and 141, as shown in FIG. 9, so that on rotation of the main drive shaft 106 in a counterclockwise direction as indicated by the arrow 143 the lower run 144 of the endless conveyer 133 is moved in a direction toward the silo wall 22 as indicated by the arrow 145.

The conveying unit 32 is of a rotary type and includes a rotatable transfer or paddle wheel member 147 located within the pan formed by the circular wall 33 and bottom wall 34 and having a hub 148 provided with a plurality of upright radially extended blades or vanes 149. The hub 148 is mounted about and secured to the main drive shaft 106 with the lower sides of the vanes 149 adjacent the bottom wall 34.

Referring to FIGS. 3 and 4 it is seen that the hands or paddles 151 of the endless conveyer 133 of the discharge conveyer 41 are movable within the confines of the circular wall 33 during their rotational movement about the shaft 43. To provide a clearance relation between the paddles 151 and the vanes 149 the outer top section of each vane 149 is cut away as indicated at 153.

In use the silo unloader 28 is lowered within the silo 20 by the winch means 31 to a working position wherein the gathering unit 30 is horizontally extended in working engagement with the top surface of the silage 21, with the guide wheel 87 in engagement with the silo wall 22. In this respect it will be noted that the wheel assembly 91 will have been adjusted to provide for the rake members 81 acting on the top surface of the silage. This working position of the unloader 28 is maintained by the automatic action of the winch means 31.

On operation of the motor 123 the rake assemblies 64, 66, 67 and 68 are reciprocated longitudinally concurrently with being moved in the upright elliptical path E previously described in connection with FIG. 6. The teeth or side sections 83 of the rake members 81, as shown in FIG. 5, are in a leading relation when the rake assemblies are moved in a direction toward the center area of the silo as indicated by the arrow 154.

The teeth or side sections 83 of the rake members 81 function to dig or claw the top layer of the silage 21 with the blades 84 acting to collect and convey the removed silage inwardly toward the center area of the silo. Since the follower plate 54 is in a following or trailing relation relative to the rake assemblies it functions as a pickup blade to gather or accumulate removed silage along its inner surface. Since this inner surface is of a curved shape corresponding substantially to the elliptical path of movement of the rake assemblies, the removed silage is maintained within the path of movement of the blade sections 84 as the rake assemblies are moved in a direction toward the center area of the silo.

On movement of the silage within the housing 94 the lift members 97 elevate the silage for discharge through the inlet openings 39 of the conveying unit 32. The silage on passing through the inlet 39 is immediately moved along the bottom wall 34 by the paddles 149 of the rotary transfer member 147 into the path of movement of the paddles 151 at the inlet 37 of the discharge conveyer 41. The material thus received by the discharge conveyer 41 is moved by the lower run of paddles 151 into the discharge chute 26. The discharge end of the conveyer 41 is provided with a pair of anchor plates 159 (FIGS 1 and 4) spaced a distance apart to straddle the silo wall 22 at the lower side or base of a discharge opening 24. The anchor plates 159 cooperate with the guide wheel 87 to maintain the drive shaft 106 in a centrally suspended position within the silo 20.

As best appears in FIG. 9 the tight or pulling side 135 of the belt 130 connecting the pulleys 129 and 132 rotates the drive shaft in a counterclockwise direction as indicated by the arrow 143. Through the bevel gear connection 113 and 116 there is developed a torque acting to move or walk the rearwardly offset silage engaging and conveying unit 30 in a clockwise direction, as indicated by the arrow 156 (FIG. 2) about the shaft 106.

This movement of the unit 30 by the torque action of the shaft 106 and bearing 113 and 116 is supplemented by the clawing action of the rake members 81 with the silage 21. This action tends to move the unit 30 longitudinally in a direction toward the silo wall 22. However, as as a result of the unit 30 being restrained against such longitudinal movement by the guide wheel 87, and the securement of its inner end 46 to the conveying unit 32, there is effected a counteraction which moves the silage engaging and conveying unit 30 in the direction of the arrow 156 in FIG. 2.

The movement of the rake assemblies 64, 66, 67 and 68 transversely of the disc members 58 and 59 during their movement over the lower half of their elliptical path E (FIG. 6) is in a rearward direction, indicated by the arrow 157 in FIG. 2, relative to the drection of travel of the rake or conveying unit 30. The rake members 81, therefore, are progressively fed downwardly into the silage 21 during the horizontal rotational movement of the rake unit 30.

When desired or necessary the walking action of the rake or conveying unit 30 horizontally about the silo may be complemented by the drive unit 119, the roller 121 of which has a fluted peripheral surface to facilitate traction with the silage.

Figure 14:
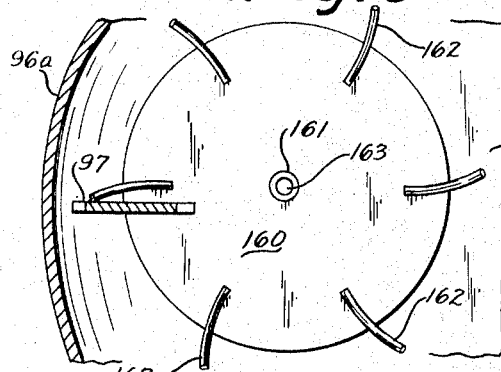
FIG. 14 is a sectional view taken along the line 14—14 of FIG. 13.
Figure 13:
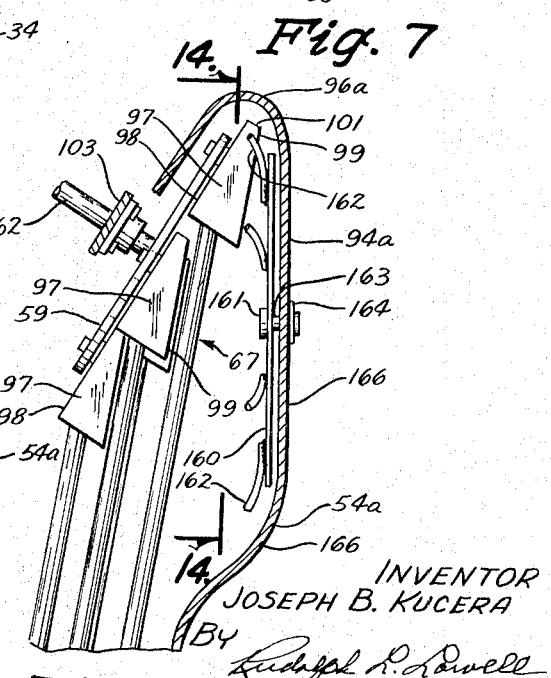
FIG. 13 is a sectional view illustrated similarly to FIG. 8 showing a modified form of a silage lift means at the inner end of the silage gathering and conveying unit.

A modified form of the silage lift means at the inner end of the rake unit 30 is shown in FIGS. 13 and 14. This modified form is similar in all respects to the lift means described in connection with FIGS. 3, 8 and 11 except for the addition thereto of a spoked wheel member 160 opposite the drive disc 59. Like numerals therefore will be used to designate like parts.

Referring to FIGS. 13 and 14 the wheel member 160 includes a disc-like hub 161 having secured thereto a plurality of circumferentially spaced outwardly extended fingers 162. These fingers may be formed of a resilient material such as a spring rod or a stiff rubber material. The hub 161 is rotatable on a shaft 163 carried in a bearing 164 secured to the housing 94a formed at the inner end of the follower plate 54a. The housing 94a is bulged forwardly, as indicated at 166, to receive the wheel member 160 in a vertical plane reversely inclined relative to the drive disc 59. The fingers 162 are inclined inwardly and downwardly at the inner side of the hub 161 and of a length to extend into the path of upward movement of the lift members 97 within the housing 94a so as to be engaged thereby.

As the fingers 161 are engaged by the lift members the wheel member 160 is rotated in the direction of rotation of the drive disc 59, whereby the fingers 161 and lift members 97 move together upwardly of the housing 94a. Silage accumulated against the forward side of the follower plate 54a and at the bottom of the housing 94a is pushed by the downward movement of the fingers 162 toward the base 96a of the housing 94a into the path of movement of the upwardly moving fingers 162 and lift members 97. This coaction of the fingers 162 with the lift members 97, accelerates the feeding of material upwardly if the housing 94a, especially when the material may have chunks or matted pieces formed therein.

Although the invention has been described with respect to preferred embodiments thereof it is to be understood that it is not to be so limited since changes can be made therein which are within the full intended scope of this invention as defined by the appended claims.

I claim:

1. A bulk material handling apparatus for use in a silo having an upright side wall with a discharge opening section comprising:
   (a) an upright drive shaft,
   (b) means supporting said shaft centrally within said silo,
   (c) power means operably connected to said drive shaft for rotating the same,
   (d) a material engaging and conveying means operably connected to said drive shaft for gathering bulk material in the silo and conveying said material to the center area of the silo, said material engaging and conveying means having a plurality of elongated rake assemblies reciprocally movable in a horizontal parallel relation in an upright elliptical path, whereby each rake assembly is successively moved into engagement with the material to feed the material horizontally to the center area of the silo,
   (e) conveying means connected to said drive shaft having one portion positioned above said material engaging and conveying means and a second portion positioned at said discharge opening section in the silo wall to move the bulk material from the center area of the silo to said discharge opening section, and
   (f) coacting means on said rake assemblies and on said conveying means for elevating the centrally positioned material into the one portion of said conveying means.

2. A bulk material handling apparatus for use in a silo having an upright side wall with a discharge opening section comprising:
   (a) a drive shaft,
   (b) means supporting said drive shaft in an upright position centrally within said silo,
   (c) power means operably connected to said drive shaft for rotating the same,
   (d) a material engaging and conveying means operably connected to said drive shaft including a plurality of elongated rake assemblies, a drive disc and a driven disc corresponding to the inner and outer ends, respectively, of said rake assemblies positioned in parallel planes inclined to the longitudinal axes of said rake assemblies with the drive disc in a driven relation with said drive shaft, means rotatably connecting the adjacent ends of said rake assemblies to a corresponding disc, a plurality of downwardly projected rake members secured to each rake assembly in a longitudinally spaced relation, and
   (e) an elevating member secured to the inner end of each rake assembly whereby on rotation of said driven disc the bulk material is moved centrally within the silo and lifted upwardly on said elevating members.

3. In a silo unloader for use in removing silage from a silo having an upright side wall with a discharge opening section comprising:
   (a) power transmission means having an upright drive shaft,
   (b) an elongated rake conveying means operably connected to said drive shaft including a first vertically extended rotatable disc member in driven engagement with said drive shaft, a plurality of horizontal elongated parallel rake assemblies having the inner adjacent ends thereof rotatably connected to said first disc member, a second vertically extended rotatable disc member adjacent the side wall of said silo, with the outer adjacent ends of said rake assemblies rotatably connected to said second disc member, said first and second disc members lying in parallel planes inclined relative to the longitudinal axes of said rake assemblies, each of said rake assemblies having a plurality of longitudinally spaced downwardly extended rake members whereby on rotation of said first and second disc members the rake assemblies are successively moved into engagement with the silage to feed the silage horizontally to the center area of the silo,
   (c) means operably associated with the inner ends of the rake assemblies for carrying the centrally positioned silage in an upward direction, and
   (d) conveyor means connected to said drive shaft for receiving and moving the upwardly moved silage to said discharge opening section.

4. A silo unloader as defined in claim 3 in which:
   (a) said means operably associated with the inner ends of the rake assemblies including a horizontal lift member secured to the inner end of each rake assembly adjacent said first disc member to lift the silage fed to the central area of the silo, and
   (b) a hub member rotatable in a vertical plane reversely inclined relative to said first disc member at a position opposite said first disc member, and fingers projected laterally outwardly from said hub member into the upward path of movement of said lift members to be engaged thereby to rotate said hub member.

5. In a silo unloader for use in removing silage from a silo having an upright side wall with a discharge opening section comprising:
   (a) power means positioned centrally of the silo,
   (b) silage engaging and conveying means having first and second horizontally spaced plate members arranged opposite each other in vertical planes, a plurality of horizontal elongated parallel rake assemblies extended between said plate members with the ends thereof rotatably connected to said plate members, said plate members having the planes thereof inclined relative to the longitudinal axes of said rake assemblies.
   (c) means for connecting said silage engaging and conveying means to said power means to rotate said first and second plate members whereby the rake assemblies are longitudinally reciprocated and moved in an upright elliptical path to engage and move the silage to the center area of the silo,
   (d) means including an elevating member secured to the inner end of each rake assembly for carrying the centrally positioned silage in an upward direction, and
   (e) conveyer means operably connected to said power means having one end portion positioned above the inner end of said silage engaging and conveying means and another end portion positioned at said discharge opening section to receive and move the upwardly carried silage to said discharge opening section.

6. A silo unloader for removing silage from a silo having an upright side wall with a discharge opening section comprising:
   (a) a silage engaging and conveying means positioned in engagement with the top surface of the silage stored in the silo including a plurality of horizontal and parallel elongated rake assemblies reciprocally movable longitudinally in an upright elliptical path,
   (b) power means for operating said silage engaging and conveying means to feed the silage to the center area of the silo and to move said silage engaging and conveying means in a horizontal path about the center area of the silo, (c) means including an elevating member carried at the inner end of each rake assembly for carrying the centrally positioned silage in an upward direction, and (d) means for receiving and moving the upwardly carried silage through said discharge opening section.

7. A bulk material handling apparatus for use in a silo having an upright side wall with the discharge opening section comprising:

(a) a drive shaft, (b) power means operably connected to said drive shaft for rotating the same, (c) a horizontal material engaging and conveying means laterally disposed within said silo with an outer end section positioned adjacent said silo side wall and an inner end section positioned in the center area of the silo for collecting and moving the bulk material stored in the silo to the center area of the silo, said material engaging and conveying means including a plurality of elongated parallel horizontally and vertically movable rake assemblies and a horizontal lift member secured to and extended inwardly from the inner end section of each rake assembly, (d) power transmission means connecting said material engaging and conveying means with the drive shaft to operate the material engaging and conveying means to move the bulk material laterally inwardly to the center area of the silo and to elevate the centrally moved material on said lift members, and (e) conveyor means connected to said drive shaft operable to pick up the elevated material and to move the elevated material from the center area of the silo to the silo discharge opening section.

8. A bulk material handling apparatus according to claim 7 in which:

(a) said rake assemblies and said lift members engage the bulk material during the inward and upward vertical movement of the rake assemblies whereby to move the material inwardly and upwardly.

References Cited

UNITED STATES PATENTS

| | | | |
|---|---|---|---|
| 2,920,752 | 1/1960 | Heinlein et al. | 198—223 |
| 2,988,238 | 6/1961 | Bruecker | 214—17 |

ROBERT G. SHERIDAN, *Primary Examiner.*